Dec. 27, 1955  P. T. MYERS  2,728,903
COMBINED SPEED AND OIL PRESSURE SYSTEM
Filed Nov. 9, 1953
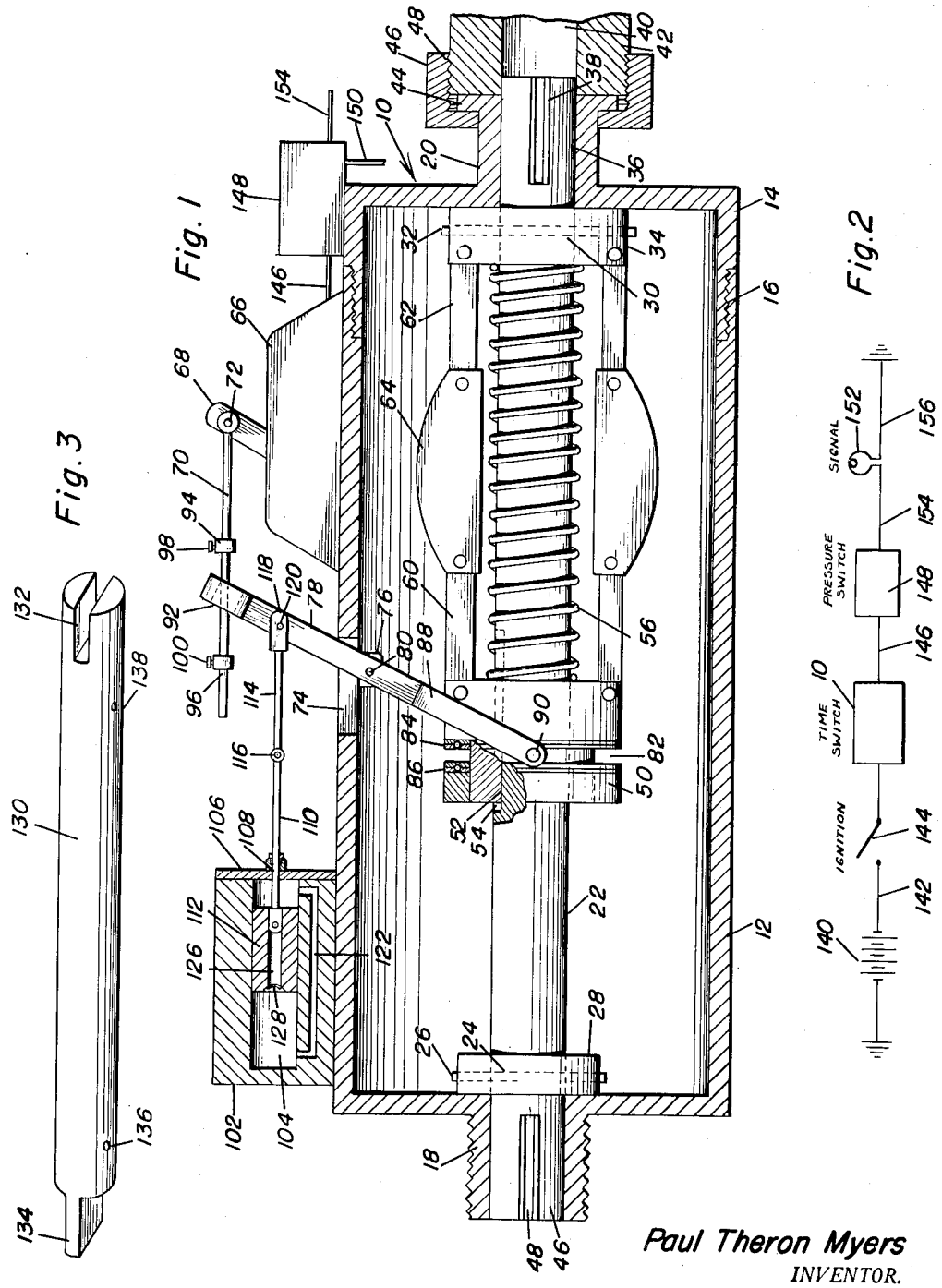
Paul Theron Myers
INVENTOR.

United States Patent Office 2,728,903
Patented Dec. 27, 1955

2,728,903

COMBINED SPEED AND OIL PRESSURE SYSTEM

Paul Theron Myers, Mount Vernon, Ind., assignor of fifty per cent to William Espenschied, Mount Vernon, Ind.

Application November 9, 1953, Serial No. 390,833

4 Claims. (Cl. 340—220)

This invention relates to an automatic switch and particularly to a time device which is responsive to the operation of a motor or other pressure lubrication device for determining the oil pressure therein.

The operation of pressure lubricated motors in the event of failure of lubricant pressure will rapidly cause great damage to a motor or other machinery. Consequently many systems have heretofore been devised for apprising the operator of the failure of lubricant pressure. The present invention provides an automatic switch which will automatically connect a signal system in the event of oil pressure failure after a predetermined period of operation of the device.

In the construction according to the present invention the switch device is connected to a shaft driven by the machine such as the tachometer shaft and means are provided for attaching the tachometer shaft at the opposite end of the switch casing. A fly ball arrangement is driven by the tachometer shaft and actuates a sliding collar which is operatively connected to a yoke arm which in turn is slidably connected with the switch actuating rod swivally connected to the switch lever of a contact device and having a time delay device delaying the operation of the yoke arm until after a predetermined interval has passed.

Accordingly, an object of the invention is to provide an improved switch.

A further object of the invention is to provide an improved switch responsive to the operation of an engine, motor or other device.

It is a further object of the invention to provide a time delay actuating switch.

Other objects and many of the intended advantages of the present invention will be apparent from the following detailed description taken in conjunction with the accompanying drawing in which:

Figure 1 is a sectional elevation through the automatic switch;

Figure 2 is a schematic diagram of a signal system utilizing the switch; and

Figure 3 is a perspective view of an alternative type shaft for the automatic switch.

In the exemplary embodiment according to the invention the automatic switch is indicated generally at 10 and is constructed as a substantially cup-shaped housing 12 and a cup-shaped cover 14 with the housing on the cover being secured together by means of a suitable threaded connection 16. A bearing sleeve 18 extends from one end of the housing and a bearing sleeve 20 from the opposite end. A shaft 22 is journaled in the sleeves 18 and 20 and extends substantially axially through the housing 12. A shaft 22 is provided adjacent one end with an aperture 24 through which extends a pin 26 to lock the bearing collar 28 in bearing relation to one end of the housing and a similar aperture 30 contains a bearing pin 32 which retains a bearing collar 34 against the opposite end of the housing so that the shaft 22 is fixed against longitudinal motion in the housing but is adapted for turning motion therein. The end 36 of the shaft 22 is provided with a slot 38 in which the end of a drive shaft 40 may be received. The drive shaft 40 is journaled in a suitable housing 42 and the sleeve 20 is provided with a collar 44 which retains a nut 46 which is screwed on to the threaded end 48 of the housing 42.

The end 47 of the shaft 22 is provided with a suitable slot 48 to adapt the shaft 22 to be connected in driving relation to any suitable device such as the drive shaft of a tachometer.

A collar 50 is slidably mounted on the shaft 22 and preferably is provided with a non-rotatable engagement such as the key 52 engaging in the slot 54 in the shaft 22 so that the collar 50 may be moved longitudinally along the shaft 22 but is non-rotatable with respect thereto. A resilient element such as the spring 56 continuously urges the collar 50 away from the collar 34 for a purpose presently to be described. The collars 50 and 34 are connected together by means of suitable links including link members 60 and 62 which are coupled to a weight or fly ball 64. The fly ball 64 being operative as the shaft 22 is rotated to compress the spring 56 and move the collar 50 toward the collar 34. A switch 66 is mounted on the housing 10 and is provided with a switch lever 68 for operating any suitable electric contact or device in the housing 66. An actuating rod 70 is connected to the lever 68 by a suitable pivot pin 72. The portion 12 of the housing is provided with a longitudinally extending slot 74 adjacent to which is disposed a pair of ears 76 in which a switch actuating arm 78 is pivoted by means of a pivot pin 80. The collar 50 is provided with a peripheral groove 82 adjacent each side of which is provided an anti-friction bearing 84 and 86. The end of the arm 78 is provided with a yoke 88 which is provided with suitable bearing pins 90 which fit into the groove 82 so that the collar 50 is operatively connected in driving relation with the arm 78. The top end of the arm 78 is provided with an aperture 92 upon which the actuating rod 70 of the lever 68 is extended and suitable stop members 94 and 96 are adjustably mounted on the rod 72 by means of set screws 98 and 100.

A fluid cylinder block 102 is suitably mounted in rigid relation with respect to the switch housing 66 preferably by mounting on the housing 12 and has a cylinder 104 therein. A cylinder head 106 closes one end of the cylinder 104 and is provided with a stuffing box 108 through which extends a piston rod 110. The piston rod 110 is connected to a piston 112 which is slidable in the cylinder 104 and the piston rod 110 is connected to the lever 78 by means of a suitable link 114. Preferably the link 114 is provided with an articulated joint 116 with the piston rod 110 and is provided with a bifurcated end 118 connected to the arm 78 by means of a pivot pin 120.

The opposed ends of the cylinder 104 are connected together by means of a suitable conduit 122 so that fluid in the cylinder 104 may flow from end to end of the cylinder in response to the application of pressure therein. The piston 112 is provided with a longitudinally extending passage 126, one end of which is closed by means of a check valve 128.

Instead of utilizing the shaft 22 having a single type of fixtures at the ends, a shaft 130 may be provided with a notch 132 at one end and a tongue 134 at the other end. The shaft 130 is provided with transverse apertures 136 and 138 for the reception of pins similar to the pins 26 and 32.

A system utilizing the time actuated switch 10 may utilize a suitable source of potential such as the battery 140 which may be the usual ignition service battery of a vehicle and a conductor 142 will extend any suitable switch which will well be the usual ignition switch 144 of the system into the time switch 10 and then through a conductor 146 into a pressure switch 148 which may be supplied with oil pressure through a conduit 150. Any suitable pressure switch may be utilized and when switches 144, 10, and 148 are closed the signal device such as the lamp 152 will be connected to ground by means of a suitable conductor 154 and 156.

In the operation of the device according to the invention the ignition switch 144 will be closed to energize the time switch 10 and the pressure switch 148. As the machine will then be at rest the shaft 40 wil be idle so the collar 50 will be distended by means of a spring 56 so that the actuating rod 70 will have moved the lever 68 to open position of the contact device (not shown) within the housing 66. Upon the beginning of rotation of the machine the shaft 40 will rotate therewith and cause rotation of the shaft 22 or 130 whichever may be in place and the rotation of the shaft 22 will cause the fly balls 68 to tend to fly outwardly so that the links 60 and 62 will draw the collar 50 toward the collar 34 and because of the operative connection between the collar 50 and the arm 78 the arm 78 will tend to pivot about the pivot 80 so that the arm 78 will tend to move into engagement with the stop 96. However, the tendency of the lever 78 to move will be counteracted by the pressure of the fluid in the cylinder 104 which will be retained in the cylinder because of the check valve 128 so that the fluid must escape through the passage 122 so that a material time will elapse before the arm 78 will come into contact with the stock 96 to actuate the lever 68 to close the contacts within the housing 56. If there has been sufficient lubricant within the machine during this time a lubricant pressure will have been communicated through the passage 150 and opened the contact switch 148 so that the closing of the contacts in the housing 66 will not operate the signal 152. However, upon the failure of pressure within the device the pressure in the switch 148 will drop allowing the contacts therein to close so that the signal 152 will be energized.

It will thus be apparent that the present invention provides a time actuated switch so that the rotation of the motor or other rotatable part of the machine will energize the switch device which will operate over a predetermined interval of time to close a suitable contact device and this time interval will allow the pressure in the lubrication system to build up so that the pressure in the lubrication system will have disconnected the circuit at another point so that the actuation of the time delay switch will not cause actuation of the signal until such time as there is a failure of lubricant pressure in the device.

For purpose of exemplification a particular embodiment of the invention has been shown, and described according to the best present understanding thereof. However, it will be apparent to those skilled in the art that many changes and modifications may be made in the arrangement and instructions of the parts thereof without departing from the true spirit of the invention.

What is claimed as new is as follows:

1. An automatic signal device for indicating the pressure of the lubricant in the lubricating system of an engine comprising an automatic switch having a casing, a shaft journaled in said casing, said shaft being adapted for connection to an engine drive shaft, a fixed collar on said shaft, a sliding collar on said shaft, means yieldingly urging said sliding collar away from said fixed collar, means urging said sliding collar towards said fixed collar, on response to rotation of said shaft, a lever pivotally mounted on said casing, said lever being operatively connected to said sliding collar, switch contacts, an actuating switch rod controlling said contacts, said rod having a sliding connection with said lever, stop means to determine the sliding between said lever and said rod, timing means delaying the operation of said lever, a signal circuit controlled by said switch contacts, and a pressure operated switch with switch contacts arranged in series with the first named switch contacts.

2. An automatic signal device for indicating the pressure of the lubricant in the lubricating system of an engine comprising an automatic switch having a casing, a shaft journaled in said casing, said shaft being adapted for connection to an engine drive shaft, a fixed collar on said shaft, a sliding collar on said shaft, means yieldingly urging said sliding collar away from said fixed collar, means urging said sliding collar toward, on response to rotation of said shaft, a lever pivotally mounted on said casing, said lever being operatively connected to said sliding collar, at one end, an actuating rod for said switch operatively connected to said lever, said rod having a sliding connection with said lever, stop means to determine the extent of the sliding movement between said lever and said rod, switch contacts controlled by said rod a fluid cylinder mounted in fixed relation to said lever, a piston slidable in said cylinder, means interconnecting the ends of said cylinder, means operatively connecting said cylinder to said arm, a signal circuit controlled by said switch contacts, and a pressure operated switch with switch contacts arranged in series with the first named switch contacts.

3. An automatic pressure indicating device for indicating the pressure of a lubricating system supplying an engine, driving a shaft, comprising an automatic switch having switch contacts operated by a switch arm, the latter operable by a lever engaging said switch arm in two predetermined positions, but moving freely between these positions, means for moving said lever by the centrifugal action of weighted members, a shaft connected with the engine shaft, driving said weighted members when the shaft is driven by the engine, a retarding device including a fluid filled cylinder, a piston therein and a conduit of restricted cross-section leading from one end of the cylinder to the other end, said piston being connected with said lever and retarding the motion of the same into the switch arm engaging position for a predetermined period, a signal circuit controlled by the switch contacts, and a pressure switch with contacts closed by the pressure of the lubricant in the lubrication system, arranged in series with the first named switch contacts, the signal circuit being thus simultaneously controlled by the pressure of the lubricant, the rotation of the engine and the retarding device.

4. An automatic indicating device for indicating the pressure of a lubricating fluid in a lubrication system of an engine, comprising an automatic switch having a casing, a rotatable shaft journaled in said casing, weight members driven by said shaft moving away from it upon rotation under the influence of centrifugal forces, a shiftable collar on said shaft linked to said weight members, resilient means yieldingly holding said collar in its position of rest and opposing the movement of the collar produced by the centrifugal action of the weighted members, a two armed lever pivoted on said casing and connected at one end with said collar, this end being thus moved when the collar is shifted by the centrifugal force acting on the weighted members, a switch arm with stops operated by the said lever when the latter has reached a predetermined position engaging the stops, a retarding device including a cylinder containing a fluid and a piston slidable in said cylinder, a by-pass conduit of restricted area connecting the two ends of the cylinder, thus limiting the rate at which the piston may move, the piston being connected with said two armed lever and being moved by the same upon movement of the collar, thus retarding the lever movement into the predetermined position in which it may engage a stop of the switch arm, switch contacts operated by the switch arm, a signal circuit controlled by said switch arm, a pressure control switch in series with said switch contacts in the signal circuit, the pressure control switch being operated by the fluid pressure in the lubricating system of the engine the pressure of which is indicated.

References Cited in the file of this patent

UNITED STATES PATENTS

| | | |
|---|---|---|
| 526,169 | Thomson | Sept. 18, 1894 |
| 797,416 | Emmet | Aug. 15, 1905 |
| 1,265,883 | Church | May 15, 1918 |
| 1,335,238 | Hopkins | Mar. 30, 1920 |
| 1,486,227 | Carter | Mar. 11, 1924 |
| 2,234,309 | Kromholz | Mar. 11, 1941 |
| 2,336,762 | White | Dec. 14, 1943 |
| 2,403,564 | Luaces | June 25, 1946 |
| 2,511,631 | Gordon | June 13, 1950 |
| 2,651,693 | Vonk | Sept. 8, 1953 |